United States Patent [19]

McMurtry et al.

[11] Patent Number: 4,975,571
[45] Date of Patent: Dec. 4, 1990

[54] OPTO-ELECTRONIC SCALE-READING APPARATUS

[75] Inventors: David R. McMurtry, Wotton-Under-Edge; William F. N. Stephens, Hawkesbury Upton; Mark E. Pleydell, Woldingham, all of United Kingdom

[73] Assignee: Renishaw PLC, Gloucestershire, United Kingdom

[21] Appl. No.: 382,700
[22] PCT Filed: Dec. 15, 1988
[86] PCT No.: PCT/GB88/01110
 § 371 Date: Aug. 15, 1989
 § 102(e) Date: Aug. 15, 1989
[87] PCT Pub. No.: WO89/05964
 PCT Pub. Date: Jun. 29, 1989

[30] Foreign Application Priority Data

Dec. 15, 1987 [GB] United Kingdom ............ 8729246

[51] Int. Cl.$^5$ .................................. G01D 5/34
[52] U.S. Cl. .................. 250/231.16; 250/237 G; 356/374
[58] Field of Search ........ 250/237 G, 231 SE, 231.16; 356/374, 375, 395; 33/707

[56] References Cited

U.S. PATENT DOCUMENTS

| | | | |
|---|---|---|---|
| 3,573,468 | 4/1971 | Lang | 250/237 G |
| 3,812,352 | 5/1974 | MacGovern | 250/237 G |
| 4,115,008 | 9/1978 | Shepherd | 356/172 |
| 4,143,268 | 3/1979 | Marold | 250/231 SE |

FOREIGN PATENT DOCUMENTS

| | | |
|---|---|---|
| 132978 | 2/1985 | European Pat. Off. . |
| 0146244 | 6/1985 | European Pat. Off. . |
| 1773428 | 3/1971 | Fed. Rep. of Germany . |
| 87/07943 | 12/1987 | PCT Int'l Appl. . |
| 1093889 | 5/1984 | U.S.S.R. . |
| 1011242 | of 1965 | United Kingdom . |
| 1138082 | 12/1968 | United Kingdom . |
| 1407353 | 9/1975 | United Kingdom . |
| 1474049 | 5/1977 | United Kingdom . |
| 1504691 | 3/1978 | United Kingdom . |
| 2185314 | 7/1987 | United Kingdom . |
| 2187282 | 9/1987 | United Kingdom . |

OTHER PUBLICATIONS

Patent Abstracts of Japan, vol. 9, No. 40, pp. 336, 1763, (Feb. 1985) JP 58-182312.
Patent Abstracts of Japan, vol. 10, No. 160, pp. 465, 2216, (Jun. 1986), JP 61-17016.
Hutley, M. C., "Diffraction Gratings", Academic Press, 1982, pp. 293-304.
"Intererence-Generated Moire Fringes in a System of Three Reflection Gratings" Optical Technology vol. 36, No. 10, Oct. 1971, pp. 588-590.

Primary Examiner—David C. Nelms
Assistant Examiner—Sherrie Hsia
Attorney, Agent, or Firm—Spencer & Frank

[57] ABSTRACT

An optical electronic scale reading apparatus comprising a scale read by a read head to determine the relative displacement therebetween. The read head comprises reflective surfaces so arranged that light from a source is reflected therefrom and interacts with the scale at first, second and third positions. At the third position, a fringe field is developed which has the same pitch as the scale. A detector is provided to receive light modulations during relative movement of the scale and read head as the fringe field interacts with the scale at the third position. These modulations are counted to determine the relative displacement between the scale and read head.

9 Claims, 5 Drawing Sheets

OPTO-ELECTRONIC SCALE-READING APPARATUS

BACKGROUND OF THE INVENTION

This invention relates to apparatus for measuring displacement between a scale having a periodic structure and a read head.

A known type of such apparatus comprises a plurality of gratings, one of which is defined by the periodic structure of the scale. An illumination means interacts with one or more of the gratings to produce an interaction product including a spatially periodic fringe field. Another of the gratings forms an analyser grating situated in a position co-planar with the fringe field and having a periodicity which is substantially the same as the periodicity of the fringe field, whereby the fringe field and the analyser grating co-operate to produce light modulations when, in operation, the scale and the read head are displaced one relative to the other. Means are provided for detecting the light modulations in order to measure the displacement. Examples of such apparatus are shown in U.S. Pat. No. 3,812,352 (MacGovern) and in Diffraction Gratings, M. C. Hutley, Academic Press, 1982, pages 293-304.

For example, the known apparatus may include a source of light arranged for illumination of the periodic structure of the scale and interacting therewith to produce the interaction product including the fringe field, the analyser grating being provided in the read head. Alternatively, the apparatus may comprise a source of light arranged for illumination of the periodic structure of the scale and interacting therewith to produce a first interaction product, an index grating positioned in the light path of the first interaction product and interacting therewith to produce a second interaction product including said fringe field, both the index grating and said analyser grating being provided in the read head.

It is expensive to provide gratings in the read head, and so it would be advantageous to avoid the use of a grating in the read head or to reduce the number of such gratings.

SUMMARY OF THE INVENTION

The present invention is characterised in that at least two of said gratings are constituted by said periodic structure of the scale; and in that the read head includes reflector means positioned in the light path of at least one of the interaction products to reflect said interaction product back onto the scale.

BRIEF DESCRIPTION OF THE DRAWINGS

Examples of apparatus according to this invention will now be described with reference to the accompanying drawings wherein.

DESCRIPTION OF THE PREFERRED EMBODIMENTS

Figure 1:
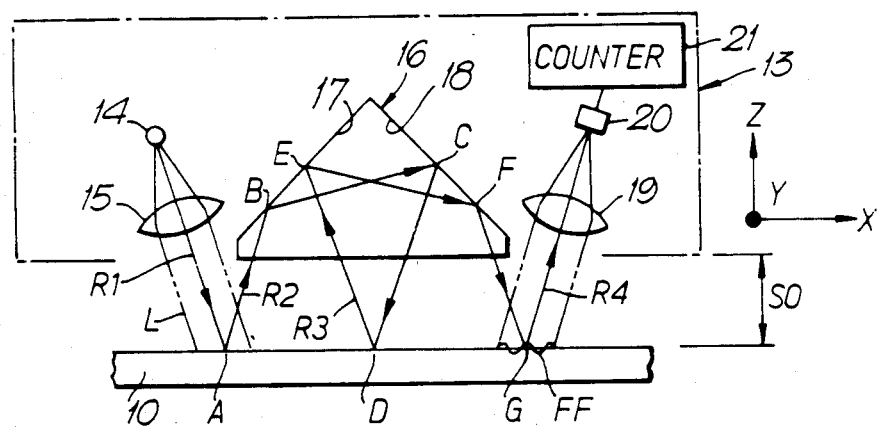
FIG. 1 is an elevation of a first example of the apparatus.
Figure 2:
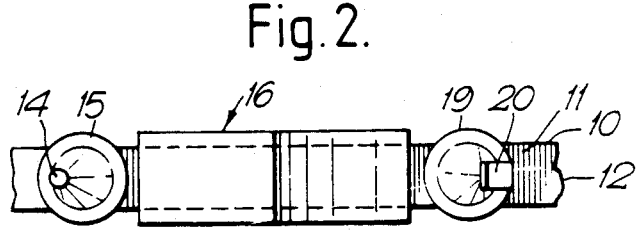
FIG. 2 is a plan view of FIG. 1.
Figure 3:
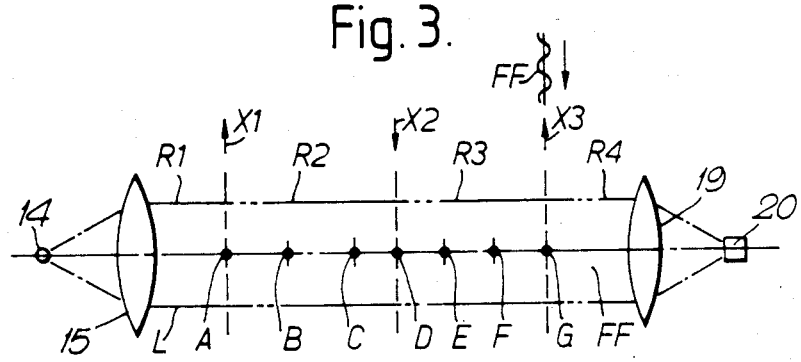
FIG. 3 is an unfolded view of the optical path through the apparatus.

Referring to FIGS. 1 to 3, a reflective scale 10 is defined by periodic light and dark marks 11 provided on an elongate scale member 12 orientated with reference to directions X,Y,Z. The marks 11 lie in the X-Y plane and effectively form a diffraction grating. A readhead 13 comprises a light source 14 for projecting a beam L of light on to the scale, a lens 15 for collimating the light, a prism 16 having flat reflective surfaces 17,18 for reflecting the light between them and the scale, and a lens 19 for focussing the light finally reflected from the scale on to an opto-electronic transducer 20. The angle between the surfaces 17,18 is 90°. The readhead is so positioned that the surfaces 17,18 each lie at 45° to the X-Y plane and each lie at 90° to the X-Z plane. The surfaces 17,18 are therefore concave in a longitudinal plane normal to the scale. The scale 10 and the readhead 13 are movable one relative to the other in the direction X and, as will be explained, the optical interaction between the scale and the prism produces modulations of the light beam L, readable by the transducer 20. A count of the corresponding transducer output by a counter 21 constitutes a measure of said movement. Although the counter 21 is shown as part of the read head 13, it may in practice be provided separately.

More specifically, rays R1 produced by the lens 15 have a first interaction with the marks 11 of the scale at a location A whereby the marks become periodic light sources producing rays R2. The rays R2 are reflected by the surfaces 17,18 at regions B,C back on to the scale at a region D for a second interaction with the marks 11 thereby producing diffracted rays R3 projected back into the prism. The surfaces 17,18 reflect the rays R3 at regions E,F back on to the scale for a third interaction with the marks 11 at a location G where the diffracted rays form a fringe field FF interacting with the marks to produce rays R4. The grating formed by the scale is not blazed to favour any particular diffraction order, and so the fringe field FF has a pitch which is the same as the marks 11. During said relative movement the fringe field FF interacts with the marks 11 to modulate the rays R4 such that each modulation represents one cyclic displacement between the fringe field and one pitch of the marks.

The unfolded view of FIG. 3 shows that the movement of the scale relative to the light beam L at the regions A,D,G occurs in directions X1, X2 and X3 respectively. It will be seen that the direction X2 is opposite to the directions X1, X3, because of the reversal produced by the arrangement of the reflective surfaces 17,18. Thus for every passage of a pitch of the marks relative to the beam L at the region A, four fringes of the field FF pass relative to each pitch of the marks 11 at the region G. Therefore the counter 21 produces four counts for every one pitch movement of the scale and in this way a four-fold interpolation of the scale movement is achieved. This is a significant advantage over prior art devices.

It should be noted that the device described is relatively insensitive to the stand-off distance SO between the scale and the reflector. In such a triple interaction device, the condition for producing a fringe field with the required pitch is that the path length from the first interaction to the second should equal that from the second interaction to the third. Since both these path lengths involve a reflection by the reflector, they depend to the same extent on the stand-off distance, and the condition is satisfied automatically if the stand-off varies.

Changing the stand-off distance, SO, between the prism 16 and the scale 10 changes the phase of the transducer output, and two or more (preferably three) prisms at appropriately different distances SO may be used to establish phase quadrature signals for determining direction of scale reading and, if desired, for further interpolation. The outputs of a respective transducer 20 for each prism are taken to a circuit such as described in International Patent Publication No. WO87/07943 for this purpose. A similar effect is obtained by positioning a simple prism 16 so as to produce moire fringes at the region G, e.g. by a small tilt of the prism about an axis in the X,Y or the Z direction. A plurality of transducers 20 is arranged laterally across the scale so as to view different phases of the moire fringes, as explained in the book by Hutley cited above.

Figure 4:
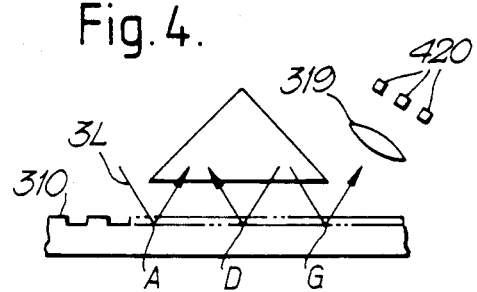
FIG. 4 is a view similar to FIG. 1 but shows a second example.

In a second example (FIG. 4) the scale is in the form of a phase grating 310 and diffraction takes place at each of the regions A,D,G. This generates quadrature modulation of the diffracted orders in the part of the beam, 3L, emanating from the region G, in the sense that the $-1, 0$ and $+1$ order have different phases of the light modulation. A lens 319 focusses these diffracted orders on to three respective transducers 420, whose outputs are processed as described in WO87/07943.

Figure 5:
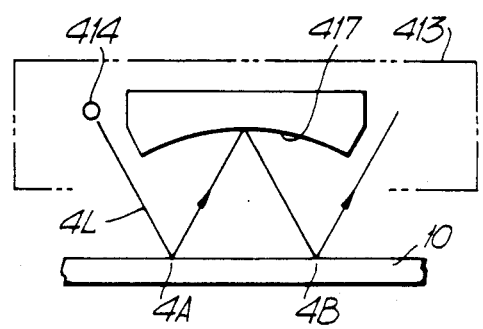
FIG. 5 is a view similar to FIG. 1 but shows a third example.

In a third example (FIG. 5) the readhead, 413, has a single reflective surface 417 being a concave two-dimensional mirror, preferably of elliptical shape. In this case the beam, 4L, interacts only twice with the scale 10, at the foci 4A, 4B of the ellipse. Thus, the mirror 417 focusses an optical image of the scale region 4A onto the region 4B. This optical image then acts as a fringe field as in the previous examples, to give light modulations as this fringe field moves in the opposite direction to the grating at region 4B. Desirably, the exact shape of the surface 417 is optimised by computer design techniques to adjust the elliptical form to give good focussing qualities over regions around 4A, 4B, rather than just at the exact focal points. Of course, the surface 417 need not be elliptical; it may be a general conic section or an aspheric surface to give foci at desired regions. Alternatively, it can be replaced by a lens in front of a plane mirror, or other catadioptric imaging system, suitably optimised to focus region 4A onto region 4B.

Figure 8:
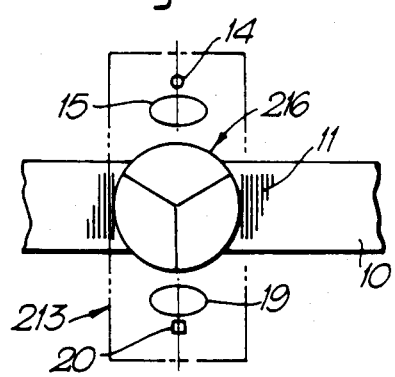
FIG. 8 is a plan view of a fifth example.

In a fourth example (FIG. 6,7), there is provided a readhead 613 having three reflective surfaces in the form of a corner cube retroreflector 616. This arrangement is insensitive to yaw error, that is, error in the relative position of the readhead about an axis in the Z direction. Otherwise, however, it works in a similar manner to the example of FIGS. 1 and 2. Because of the yaw insensitivity, it is also possible to arrange such a read head laterally across the scale, instead of longitudinally along it. A fifth example employing a read head 213 having a retroreflector 216 arranged in this manner is shown in FIG. 8. In this case, operation is as in the first example, but triangulation errors due to variations in the stand-off distance are substantially eliminated.

Figure 6:
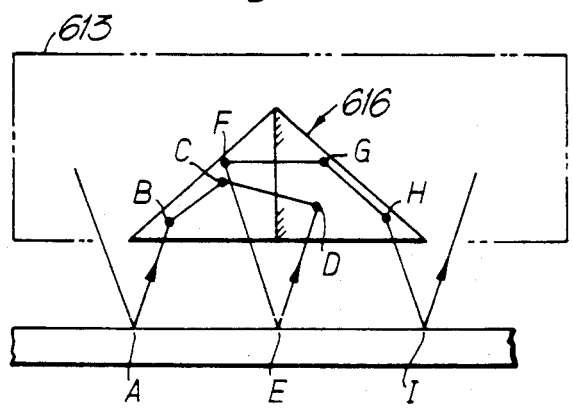
FIG. 6 is an elevation of the apparatus according to a fourth example.
Figure 7:
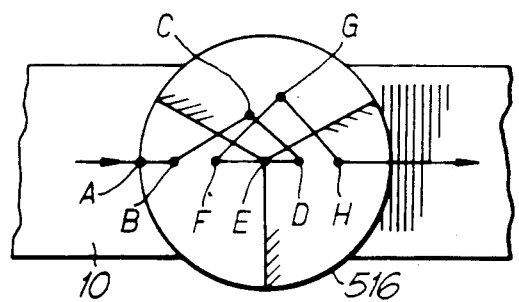
FIG. 7 is a plan view of FIG. 6.

In the examples of FIGS. 6–8, the corollary of the yaw insensitivity is that moire fringes cannot be produced by misaligning the read head. FIGS. 9–12 therefore show modifications which enable phase information to be obtained for determining the direction of travel and for interpolation.

Figure 9:
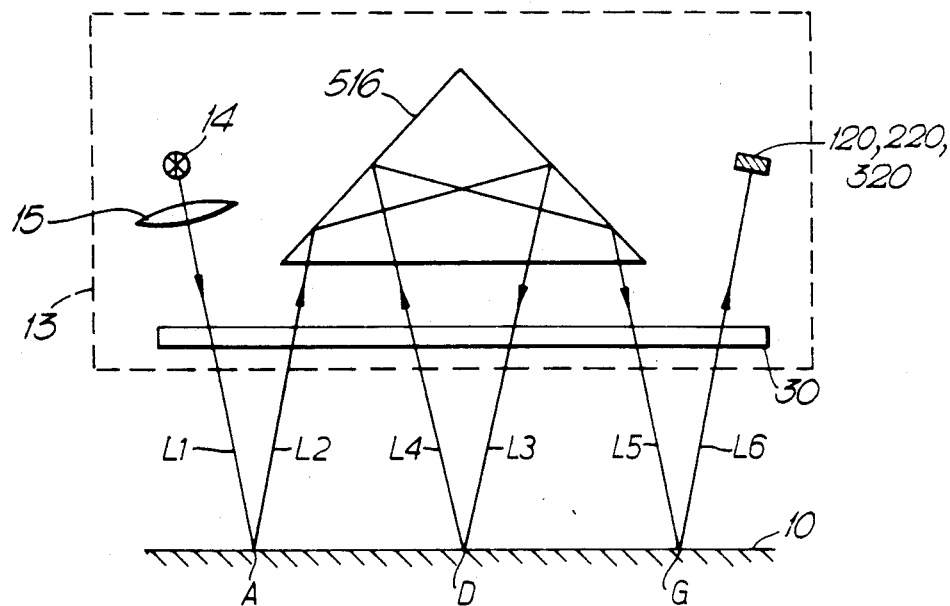
FIG. 9 is an elevation of a sixth example, corresponding to FIG. 6 but showing an improvement.
Figure 10:
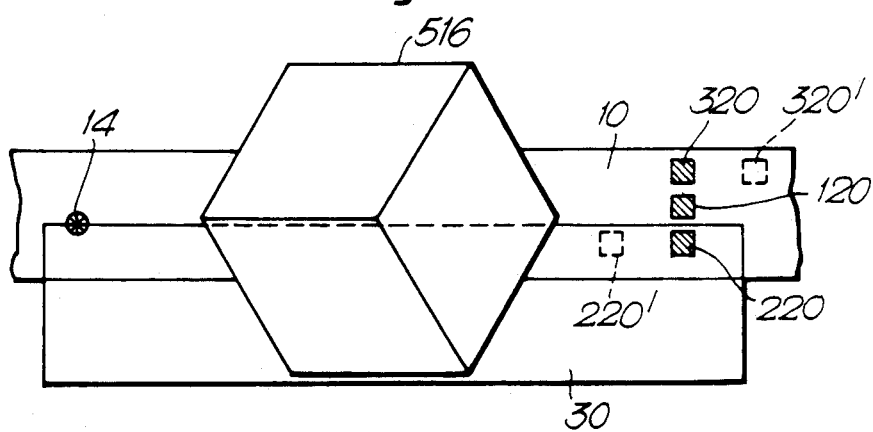
FIG. 10 is a plan view of FIG. 9.
Figure 11:
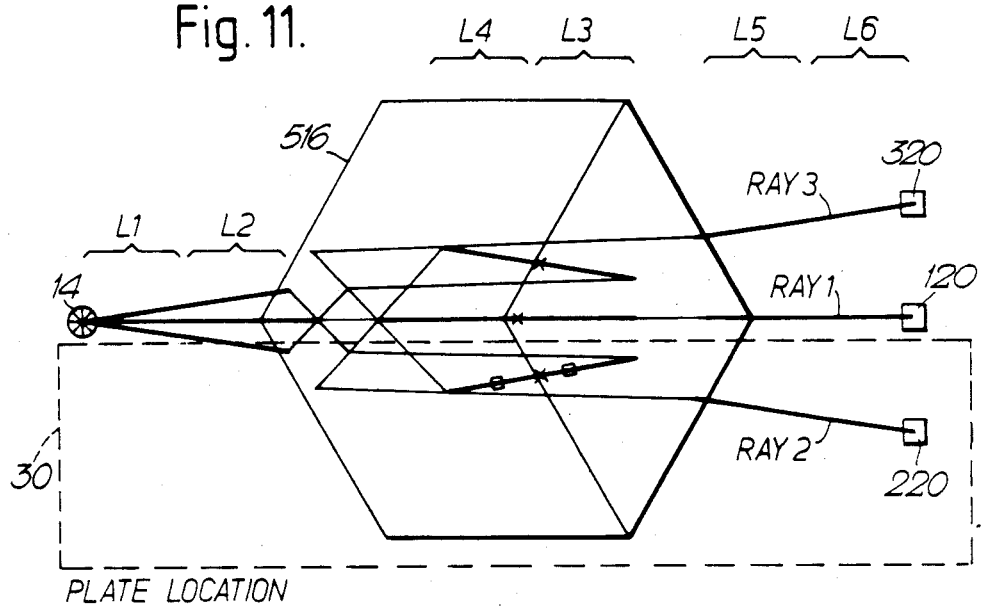
FIG. 11 is a more detailed view of FIG. 10, showing ray paths.

Referring to FIGS. 9 to 11, the device shown is generally similar to the examples above, in that it has a scale 10 having periodic marks, over which a readhead 13 is movable in a longitudinal direction. The readhead 13 includes a light source 14 (such as a light emitting diode), a corner cube retro-reflector 516, and three laterally spaced detectors 120, 220, 320. The light from the source 14 is collected by a lens 15, which however does not produce a parallel collimated beam—the beam is still slightly divergent so that it can be considered as producing several slightly divergent rays as described below. In particular three such rays are described below, being the rays which end up at the detectors 120, 220, 320.

FIG. 9 shows that the path of one such ray has a first leg L1 to an interaction with the scale 10 at a point A. It is then reflected along a leg L2, and retro-reflected by the retro-reflector 516 along a leg L3 to have a second interaction with the scale at a point D. The resulting fringes pass along a leg L4 and are further retro-reflected by the retro-reflector along a leg L5 to have a third interaction with the scale at a point G. The resulting modulated light passes along a leg L6 of the ray to the detector. In FIG. 11, the legs L1–L6 of the ray are shown by thicker lines, while internal reflections within the retro-reflector are shown by thinner lines.

As described in the previous examples, the result of the reflection from point A to point D is to produce a fringe field at point G, having the same periodicity as the scale. The fringes of this field then interact further with the scale at point G (by a kind of "shuttering" effect) to produce light modulations which can be detected by the detectors 120, 220, 320.

Unlike the systems of the previous examples, the present embodiments of the invention provide some means for introducing different phase shifts into the rays which reach the detectors. More particularly, the different rays have interactions with the scale at different phase angles of the scale pitch. This alters the phasing of the resulting detected fringes. They can then be analysed to produce direction information, in a similar manner to the moire fringes produced by misaligning a prism or mirror reflector.

In FIG. 9, this phase shift means comprises a simple parallel-sided glass plate mounted within the readhead 13. As can be seen from FIGS. 10 & 11, the glass plate 30 only extends partially across the width of the scale 10. In particular, considering the ray 1 in FIG. 11, which is a 'straight-through' ray from the source 14 to the centre detector 120, none of the legs L1 to L6 of this ray pass through the plate 30. Consequently, the plate introduces no phase shift at all to this ray. In contrast to this, ray 2 (which goes to the detector 220) passes through the plate 30 on leg L2 (between the points A and D) and on leg L5 (between the points D and G). Transmission through the glass plate at an oblique angle produces an offset in the path of the ray, by refraction so that it interacts with the scale 10 slightly further along the scale than ray 1, at a different phase angle of the scale pitch. It also travels a greater distance than would otherwise be the case, but it will be seen that the increase in the path length is the same in legs L2 and L5, so that there is still equality of path length between the points of interaction A, D and the points D, G. This equality of path length is important for producing the desired fringes, as discussed above.

A simple readhead could just make use of the two rays, ray 1 and ray 2 just described. The thickness of the plate 30 is chosen so that the detectors 120, 220 produce quadrature sine and cosine outputs. These are fed to a counter and/or interpolator, in a well known manner. Because there are now the two separate quadrature outputs from the readhead, it is possible to derive the necessary direction information (as well as the count of the distance moved) from the single readhead, whereas our previous examples required two or more readheads to provide such information. The direction is given by the relative phases of the quadrature outputs, as is well known.

FIG. 11 also shows a third ray, ray 3, which passes through the glass plate 30 on legs L3 and L4, but not on legs L2 and L5. This ray ends up at the detector 320, to produce a third phase shifted output which can be combined with the outputs of detectors 120, 220. These three signals can be arranged to be in tripliture, and combined by circuits of the type disclosed in FIGS. 16 & 17 of our earlier International Patent Specification No. WO87/07943, in order to give quadrature outputs.

Although FIGS. 9 to 11 show the length of the plate 30 to be sufficiently long that the ray 2 also passes through it on legs L1 and L6 of its path, as well as legs L2 and L5, this has no effect in practice. The place in which it is particularly desired to introduce an offset along the scale, so as to give a relative phase shift (of equal amounts) between the resulting fringe patterns, is between the points A, D and the points D, G.

The system is relatively tolerant to misalignments of the plate 30 such that it is not parallel to the scale 10. The use of a retro-reflector means that the system is also relatively tolerant to yaw misalignments of the retro-reflector, since such a device has the property of always returning an incident ray in a parallel direction, whatever its alignment. It follows that the system described is very insensitive to misalignment of the readhead as a whole relative to the scale.

In theory, the three outputs of the detectors 120, 220, or 320 shown in FIG. 11 cannot be combined in the manner disclosed in FIGS. 16 and 17 of specification No. WO87/07943, because the phase shifts of the detectors 320 and 220 relative to the detector 120 are identical (because both ray 2 and ray 3 have passed through the glass plate 30 on two legs of their paths). However, in practice we have found that useful results are nevertheless obtained. We presently attribute this to misalignments in the setup of the apparatus, such that the phase shifts of ray 2 and ray 3 are not exactly equal.

Figure 12:
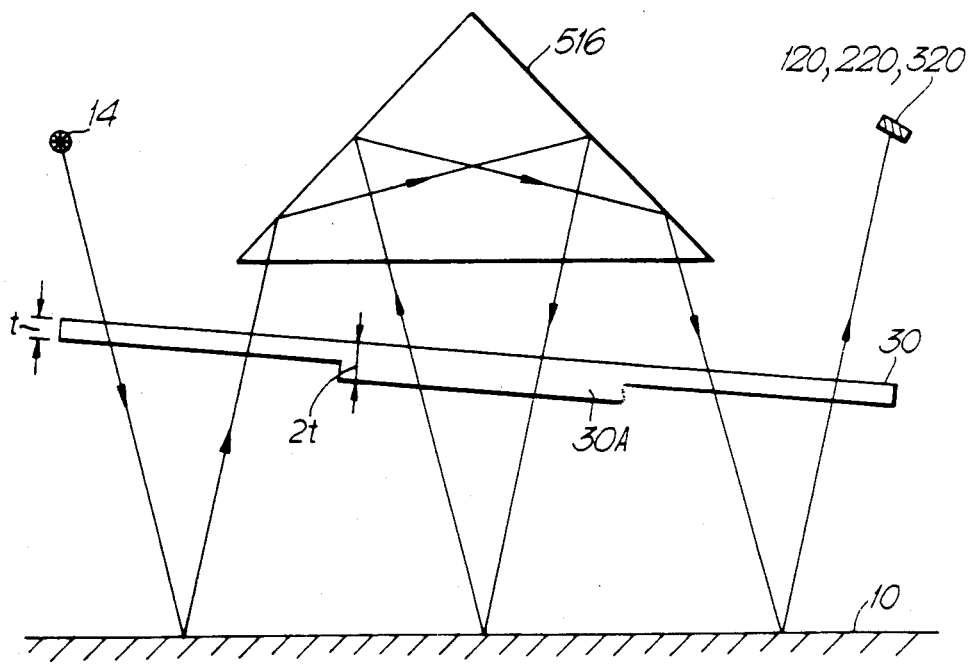
FIG. 12 is an elevation corresponding to FIG. 9 but showing a further modification.

FIG. 12 shows an improvement over FIG. 11 intended to give different phase shifts to each of the three rays, ray 1, ray 2, ray 3. Here, a glass plate is used which has a thickness t for most of its length, except for a central region 30A which has a double thickness of 2t. Such a double thickness can easily be produced by bonding together two pieces of glass of thickness t. The result is that ray 2, on its legs L2 and L5, passes through the plate at a region where it has the single thickness t; whereas ray 3 passes through the glass on its legs L3 and L4 where there is a double thickness 2t. Consequently, ray 3 has twice the offset and its fringes have twice the phase shift (relative to ray 1) of ray 2. Put another way, ray 1 will lead ray 2 by a phase shift which is equal to the phase shift by which ray 3 lags ray 2. Such a phase relationship of the three outputs of the detectors is ideal for feeding to the tripliture combination circuit described in FIGS. 16 and 17 of International Specification No. WO87/07943, because of the symmetry of the phase shifts. Of course, it is likely that the phase difference between ray 1 and ray 2 will not be exactly equal to that between ray 2 and ray 3, but the arrangements shown in WO87/07943 are specifically designed to produce outputs which are accurately in quadrature (sine and cosine) from such imperfect inputs so as to allow the derivation of direction information and to allow interpolation of the signals.

The same effect as shown in FIG. 12 can be produced in other ways. For example, the central region 30A of the plate 30 could have a different refractive index from the rest of the plate, instead of a different thickness, though this might be difficult to put into practice.

The actual phase shift introduced is also affected by the angle of the plate 30 relative to the scale (if not parallel) and by the angle of incidence of the light ray onto the plate (which is governed by the relative orientations of the source and the detectors). Thus, to produce different phase shifts for ray 2 and ray 3, one could use a complex plate which was tilted at a different angle in the region of legs L3 and L4 than in the regions of legs L2 and L5. Alternatively, to alter the relative orientation of the source and detectors as between ray 2 and ray 3, one could arrange the detectors in a diagonal line, spaced apart longitudinally as well as laterally, as shown at 120, 220', 320' in FIG. 10. A similar effect can be produced by orienting the readhead relative to the scale in the manner shown in FIG. 8.

It will be seen that the noted disadvantages of FIGS. 6–8 are essentially overcome by having at least two detectors in the readhead, with the paths of rays to the respective detectors being so arranged as to introduce a phase shift of one resulting fringe pattern relative to the other. Naturally, the use of a glass plate such as the plate 30 is only one possible means for producing this end and many other such means of introducing a phase shift can be envisioned.

Figure 13:
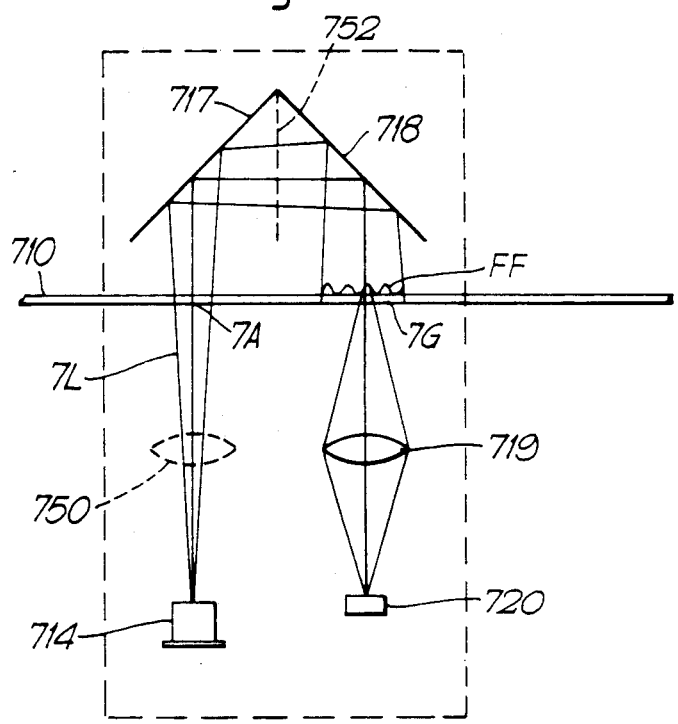
FIG. 13 is an elevation of a seventh example.

FIG. 13 shows an example having only two interactions with the scale, instead of three. A light source 714 projects a divergent beam 7L through a transmissive scale 710, at 7A. Reflective surfaces 717, 718 reflect the beam back onto the scale, to produce a fringe field FF at region 7G.

This interacts again with the grating of the scale, to produce light modulations which can be detected by a detector 720. An imaging system 719 images the plane containing the fringe field and the scale onto the detector. To ensure that the fringes have the same periodicity as the scale, the distance from the source 714 to the first interaction at 7A should equal the distance from 7A to 7G. This system produces three counts at the detector for every one pitch movement of the scale.

Alternatively, in a modification, the device of FIG. 13 may include an optional lens 750, to collimate the beam 7L. In this case, the resulting fringe field is produced by a Fresnel-type mechanism (rather than the Fraunhofer-type mechanism as previously). Such a fringe field, however, is only formed in discrete Talbot planes, and so the scale 710 must be positioned co-planar with one of these Talbot planes. This system produces only two counts at the detector for each one pitch movement of the scale.

Figure 14:
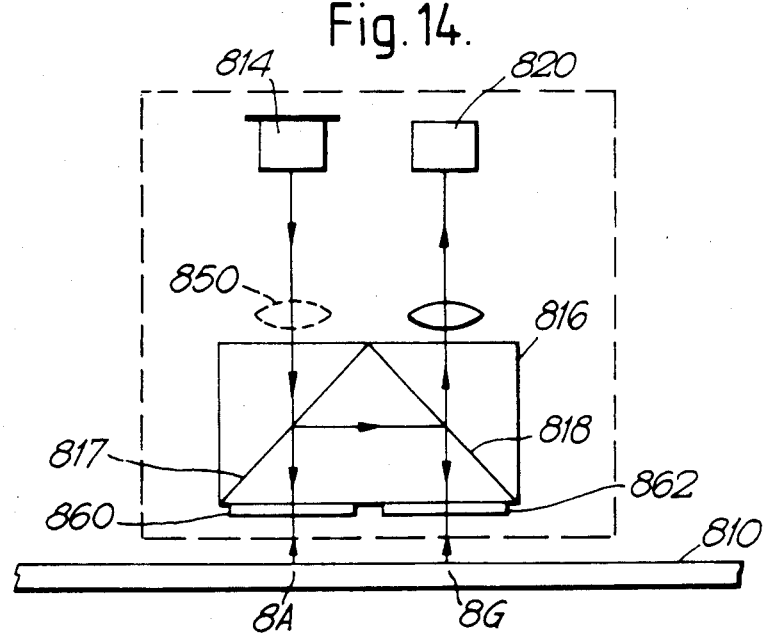
FIG. 14 is an elevation of an eighth example.

FIG. 14 shows an example similar to FIG. 13, except that the scale 810 is reflective rather than transmissive. Here, the surfaces 817 and 818 are polarising beam splitters, in a glass block 816. Incident light from a source 814 passes through the beam splitter 817 and through a quarter wave plate 860, to have a first interaction with the scale 810 at a region 8A. The interaction product passes back through the quarter wave plate 860 to the surface 817. The two passes through the plate 860 cause a 90 degree rotation of the plane of polarisation, so that now the interaction product is reflected by the surface 817, and by the surface 818, to the scale region 8G. Here, a fringe field is developed, under the same conditions as discussed for FIG. 13, and is modulated by the scale. The resulting modulated light passes back through the surface 818. Again, the light has passed twice through a quarter wave plate 862, and so now it is of the correct polarisation to be transmitted to a detector 820. Of course, in practice the two quarter wave plates 860, 862 may be amalgamated into a single plate on the underside of the glass block 816. As in FIG. 13, there may be an optional collimating lens 850.

The devices of FIGS. 13 and 14 require a coherent source of light. This could be a point source (a pin-hole) or a line source. More practically, however, the source should be a laser diode.

A reason for preferring a triple interaction over a double interaction, therefore, is that the light source can be diffuse and broad-band (non-coherent) thus saving the expense of a laser diode. Moreover, the double interaction only produces two or three counts at the transducer for every single pitch movement of the scale, instead of the four counts of the example shown in FIG. 1.

It is also possible to have a simple version of a system such as in FIG. 9, with point or line source and detectors with only two interactions (at points A and D). However, as before it is preferred to have three interactions because this produces a significant multiplication of the effect detected and consequently a greater resolution. It also enables the use of extended source and detectors rather than point or line source and detectors.

Double interaction systems such as FIGS. 13 and 14 can, if desired, have a single grating added to the readhead to make them into triple interaction systems. For example, the readhead may have a grating in the place of the optional lens 750 in FIG. 13, or between the position 7G and the detector system. The light then has two interactions with gratings formed by the scale, and one with the grating on the readhead. The interaction positions should be spaced apart to ensure that the fringe field has a pitch matching that of the final grating, in each case. Such a system only requires one grating on the readhead, compared with two in prior art triple interaction systems, but it will normally be preferred to use one of the other triple interaction systems described herein, which do not require any gratings on the readhead.

We claim:

1. Apparatus for measuring displacement between a scale having a periodic structure and a read head, comprising:
    first grating means;
    illuminating means for illuminating said first grating means and interacting therewith to produce a first interaction product;
    second grating means situated in the light path of the first interaction product and interacting therewith to produce a second interaction product including a spatially periodic fringe field;
    third grating means situated in a position co-planar with the fringe field and having a periodicity which is substantially the same as the periodicity of the fringe field, whereby the fringe field and the third grating means co-operate to produce light modulations when, in operation, the scale and the read head are displaced one relative to the other; and
    means for detecting said modulations, wherein
    all three of said grating means are constituted by said periodic structure of the scale; and
    the read head includes reflector means positioned in the light path of both the first and second interaction products to reflect said interaction products back onto the scale.

2. Apparatus according to claim 1, wherein the periodic structure of the scale is provided by spaced apart, parallel lines; and the illuminating means and detecting means are spaced apart from each other in the direction of the lines.

3. Apparatus according to claim 1, wherein the periodic structure of the scale is provided by spaced apart, parallel lines; and the illuminating means and detecting means are spaced apart from each other in a direction perpendicular to the direction of the lines.

4. Apparatus according to claim 1, wherein the reflecting means is a prism.

5. Apparatus according to claim 1, wherein the reflector means comprises two distinct reflecting surfaces which are at an angle to each other so as to be concave in a longitudinal plane normal to the scale.

6. Apparatus according to claim 1, wherein the reflector means comprises a retro-reflector.

7. Apparatus according to claim 1, wherein said detecting means comprises at least two detectors, each arranged to detect modulations produced by a respective said fringe field, the read head including phase shifting means for shifting the phase of one said fringe field relative to the other.

8. Apparatus according to claim 7, wherein the phase shifting means comprises a glass plate.

9. Apparatus according to claim 6, wherein the retro-reflector is a corner cube retro-reflector.

* * * * *